INVENTORS.
Dietrich A. Jenny &
Egon E. Loebner
BY
ATTORNEY.

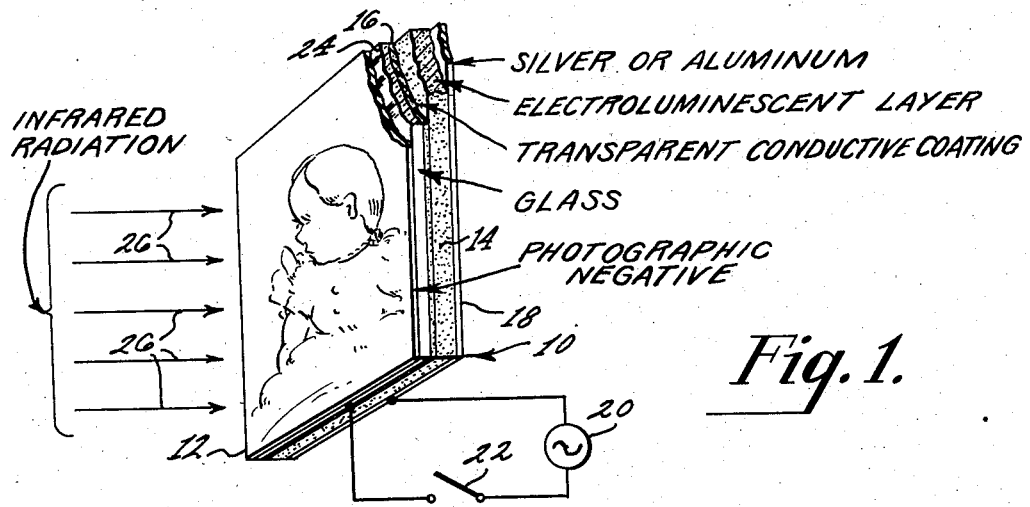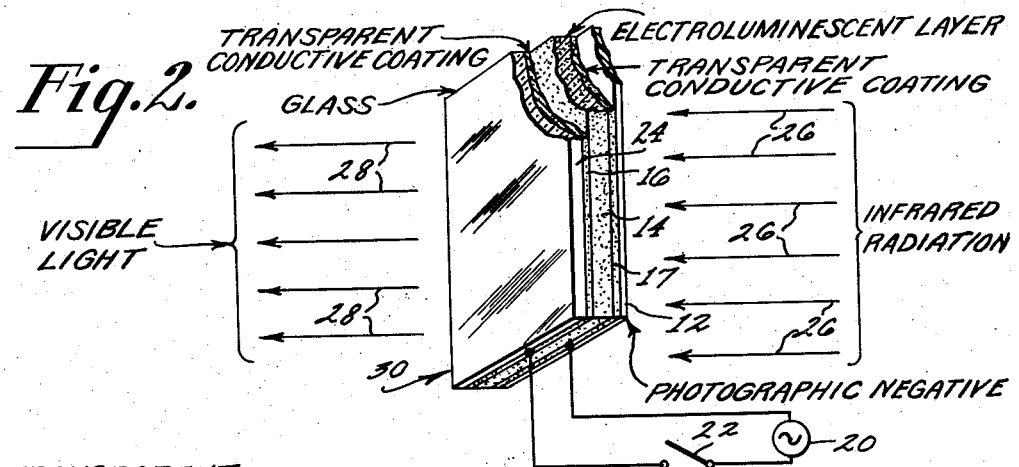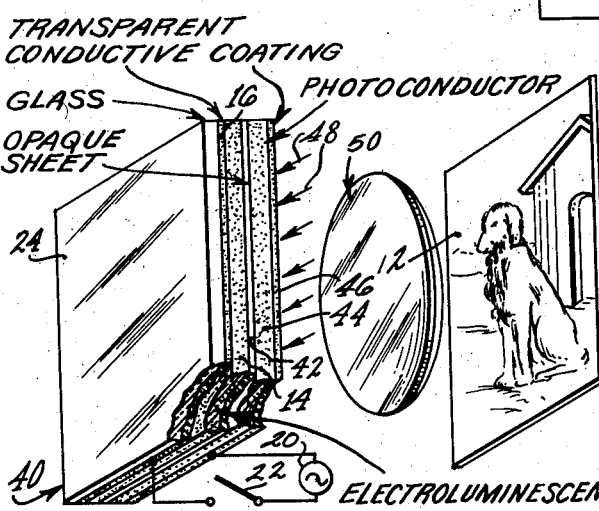

United States Patent Office 2,883,556
Patented Apr. 21, 1959

2,883,556

LIGHT INVERTERS

Dietrich A. Jenny, Princeton, and Egon E. Loebner, Belle Mead, N.J., assignors to Radio Corporation of America, a corporation of Delaware Application May 31, 1956, Serial No. 588,417

4 Claims. (Cl. 250—213)

This invention relates to light inverters generally, and more particularly to novel methods of and apparatus for inverting a negative image to provide a positive image. The methods of and apparatus of the present invention for inverting light are particularly useful in the field of photography wherein it is desirable to view a photographic negative as a positive image quickly, and without utilizing the conventional developing process.

In the field of conventional photography, a photographed object is produced first as a negative transparency. To obtain a positive image, that is, a light inverted image, a photographic print is made from the negative transparency. The process of photographic printing comprises the steps of light sensitizing photographic material, such as photographic printing paper, through the negative transparency, and subsequently developing the photographic printing paper in photographic chemical solutions. This process should be performed by a skilled operator for best results. It is often desirable, however, to view one or more negative transparencies quickly, and without the expense, consumption of time, and inconvenience of the aforementioned conventional photographic printing process.

Accordingly, it is an object of the present invention to provide improved methods of and apparatus for producing a light inverted image from a negative transparency quickly, economically, and in a dry state.

It is another object of the present invention to provide improved methods of and apparatus for viewing photographic negatives as positives by means that do not require the services of a skilled photographer or technician.

These objects and related advantages of the present invention are attained in novel methods and apparatus utilizing the infrared quenching effect in photoconductors and/or electroluminescent phosphors. In its simplest form, apparatus for producing a light inverted image of a transparency, for example, comprises an electroluminescent area cell condenser having at least one plate that is both transparent and conductive. The cell is energized by an alternating current (A.-C.) voltage applied to the conductive plates. The transparency whose image is to be inverted is placed on one side of the cell and exposed to an infrared energy source. The infrared radiation transmitted through the transparency and impinging upon the electroluminescent phosphor will selectively quench the electroluminescence of the phosphor in amounts monotonically increasing with the increased transmission of infrared radiation. Thus, the image of the transparency is produced as a positive image on the electroluminescent phosphor. In other embodiments, an infrared quenchable photoconductive layer is combined with the electroluminescent phosphor layer, in a sandwich-like structure, to produce a light inverted image on the electroluminescent layer. Infrared radiation is directed through the transparency and onto the photoconductive layer. An A.-C. voltage applied between the photoconductive layer and the farthest surface of the electroluminescent layer will produce an intensified light inverted image of the transparency. By placing a semi-transparent plastic sheet between the photoconductive layer and the electroluminescent layer, light regeneration takes place that increases the intensity of the light inverted image. If an infrared radiation phosphor and means to excite this phosphor are included in the sandwich-like structure, and the transparency whose image is to be light inverted is placed between the infrared radiation phosphor and the photoconductor, a compact structure is provided for viewing the transparency as a light inverted image.

The novel features of the present invention, as well as the invention itself, both as to its organization and method of operation will be understood in detail from the following description, when considered in connection with the accompanying drawing in which similar reference characters designate similar parts, and in which:

Fig. 1 is a view in perspective, with parts broken away, of a light inverter, in accordance with the present invention;

Fig. 2 is a view in perspective, with parts broken away, of another embodiment of the light inverter of the present invention;

Fig. 3 is a view in perspective, with parts broken away, of a further modification of the light inverter of the present invention;

Figure 4:
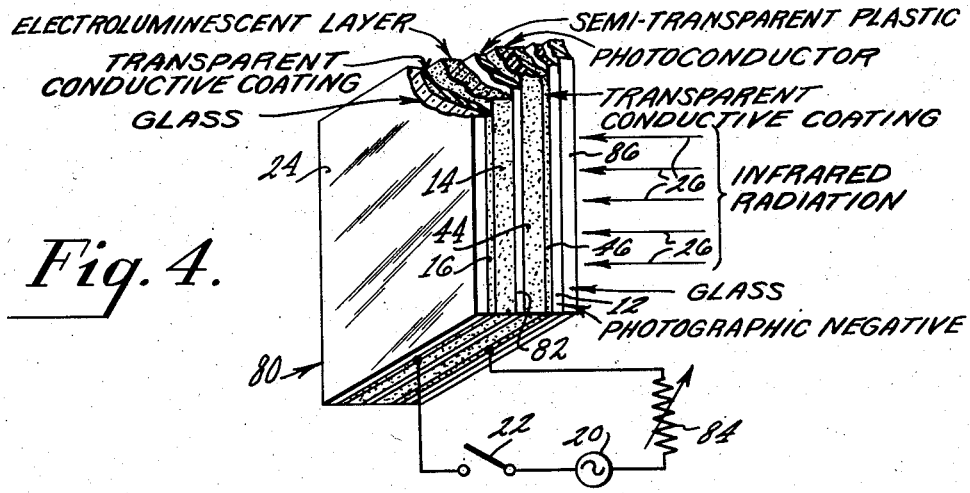
Fig. 4 is a view in perspective, with parts broken away, of still another modification of the light inverter of the present invention.

Referring now particularly to Fig. 1, there is shown a light inverter 10, in accordance with the present invention, for inverting the image on a transparency 12, such as a photographic negative, as a positive image, to be viewed on the surface of an electroluminescent layer 14. The electroluminescent layer 14 may comprise an electroluminescent phosphor, such as zinc sulfide embedded in glass or transparent plastic. A transparent conductive coating 16, adjacent the front surface of the electroluminescent layer 14, and a metallic plate 18 of silver or aluminum, for example, adjacent the rear surface of the electroluminescent surface 14, comprises an electroluminescent area cell. Any suitable source of alternating current (A.-C.) voltage 20 is connected between the transparent conductive coating 16 and the conductive plate 18 through a switch 22. The A.-C. voltage source 20 may be of any frequency, from a few cycles to five megacycles, for example, and of an amplitude in the neighborhood of between 80 and 2,000 volts, for example. The transparent conductive coatings, such as the coatings 16, are known. "TIC" glass comprises such a coating.

A sheet of glass 24 is fixed adjacent the transparent coating 16 to form a sandwich-like structure with the electroluminescent layer 14 and the plate 18 to lend the structure rigidity. The components of the aforementioned sandwich-like structure are shown exaggerated in thickness for illustrative purposes only, and it will be understood that the actual combined sandwich-like structure is relatively thin. The transparency 12 whose image is to be inverted is placed against the glass sheet 24 and irradiated with any suitable source (not shown) of infrared radiation 26.

The method of producing a light inverted image, of the image of the transparency 12, on the surface of the electroluminescent layer 14 will now be described. The transparencey 12 is placed against the glass sheet 24 and irradiated with infrared energy 26. After a few seconds of such infrared irradiation, the infrared irradiation and the transparency 12 are removed. A voltage is supplied across the electroluminescent layer 14 by closing the switch 22. A positive image, that is, a light inverted image, of that on the transparency 12 will now appear on the electroluminescent layer 14. It will be understood that the light inverter 10 may housed within a suitable container, not shown.

Referring now to Fig. 2, there is shown a light inverter 30 that is a modification of light inverter 10 of Fig. 1, and differs therefrom in that the rear plate 18 of Fig. 1 has been replaced by a transparent conductive coating 17. The transparency 12, whose image is to be inverted, is placed adjacent to the conductive coating 17 and irradiated with infrared energy 26 for a few moments. The switch 22 is now closed to energize the electroluminescent area cell comprising the transparent conductive coatings 16 and 17 separated by the electroluminescent layer 14. The light inverted image of the image on the transparency 12 may now be viewed through the glass 24, by visible light 28 emanating from the electroluminescent layer 14.

Where a greater degree of sensitivity is required, use is made of the infrared quenchable properties of photoconductive materials, such as cadmium sulfide. In the light inverter apparatus illustrated in Fig. 3, there is shown a sandwich-like structure 40 of a series of successive layers comprising a glass sheet 24, a transparent conductive coating 16, an electroluminescent layer 14, an opaque dielectric sheet 42, a photoconductive layer 44 of a photoconductive material, and a transparent conductive coating 46. The transparent conductive coatings 16 and 46 are connected to each other through a source of A.-C. voltage 20 and a serially connected switch 22. The conductivity of the photoconductive layer 44 is a function of visible light impinging thereupon. In accordance with the present invention, a source of visible light 48 is directed toward the transparent conductive coating 46. The transparency 12 whose image is to be viewed as a positive image is positioned so that its image can be projected onto the conductive coating 46 by infrared radiation 26 through a suitable lens system, represented by a lens 50.

Figure 5:
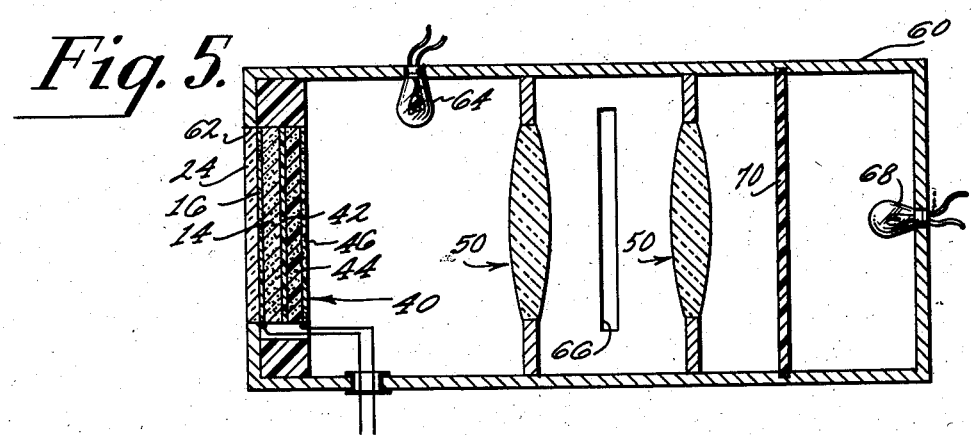
Fig. 5 is a cross-sectional view, in side elevation, of the embodiment of the light inverter illustrated in Fig. 3.

One arrangement of the light inverter illustrated in Fig. 3, housed within an enclosure or container 60, is shown in Fig. 5. The sandwich-like structure 40, in Fig. 5, is fixed within an opening 62 in the front of the container 60. A lamp 64, connected to any suitable source of electrical energy (not shown) is suspended from the top wall of the container 60 to provide the visible light for increasing the conductivity of the photoconductive layer 44. A vertical slot 66 in the wide wall of the container 60 provides means for positioning a transparency whose image is to be inverted, between a pair of lenses of the lens system 50. The source of infrared energy 26, shown in Fig. 3, is provided in the embodiment of the invention shown in Fig. 5 by means of a lamp 68 and an infrared filter 70. The infrared filter 70 is positioned within the container 60, between the lamp 68 and the lens system 50, so that light from the lamp 68, fixed to the rear wall of the container 60, will pass through the infrared filter 70 and emerge as infrared energy.

The operation of the light inverter illustrated in Fig. 5 will now be explained. The transparency whose image is to be inverted is inserted through the slot 66 of the container 60. The lamps 64 and 68 are energized, by any suitable means (not shown). The lens system 50 will focus the transparency onto the transparent conductive coating 46 of the sandwich-like structure 40. A source of A.-C. voltage, not shown in Fig. 5, will be applied between the conductive coatings 16 and 46, as in Fig. 3. A light inverted image, that is, a positive of the negative transparency, may now be viewed through the glass 24.

Referring now to Fig. 4, there is shown a sandwich-like structure 80 that may be substituted for the sandwich-like structure 40 of Fig. 3. The sandwich-like structure 80 comprises, in the order named, a glass sheet 24, a transparent conductive coating 16, an electroluminescent layer 14, a semi-transparent plastic 82, a photoconductive layer 44, and a transparent conductive coating 46. A source of A.-C. voltage 20 is applied between transparent coatings 16 and 46 through a serially connected switch 22 and a variable control resistor 84. The transparency 12, whose image is to be inverted, may either have its image projected onto the conductive coating 46, in the manner described in Fig. 3, or it may be placed directly against the conductive coating 46, as shown in Fig. 4. In the latter case, a glass sheet 86 is used to hold the transparency 12 firmly against the conductive coating 46. Infrared radiation 26 is then directed through the transparency 12 and toward the photoconductive layer 44 and the electroluminescent layer 14. The sandwich-like structure 80 of Fig. 4 is a light regenerative device because light from the electroluminescent layer 14 will activate the photoconductive layer 44 and serve to reduce its resistivity. The variable resistor 84 may be used to limit the intensity of the voltage applied by the generator 20, and thereby provide means for adjusting the gamma values of the light inverted image that may be viewed through the glass sheet 24.

Figure 6:
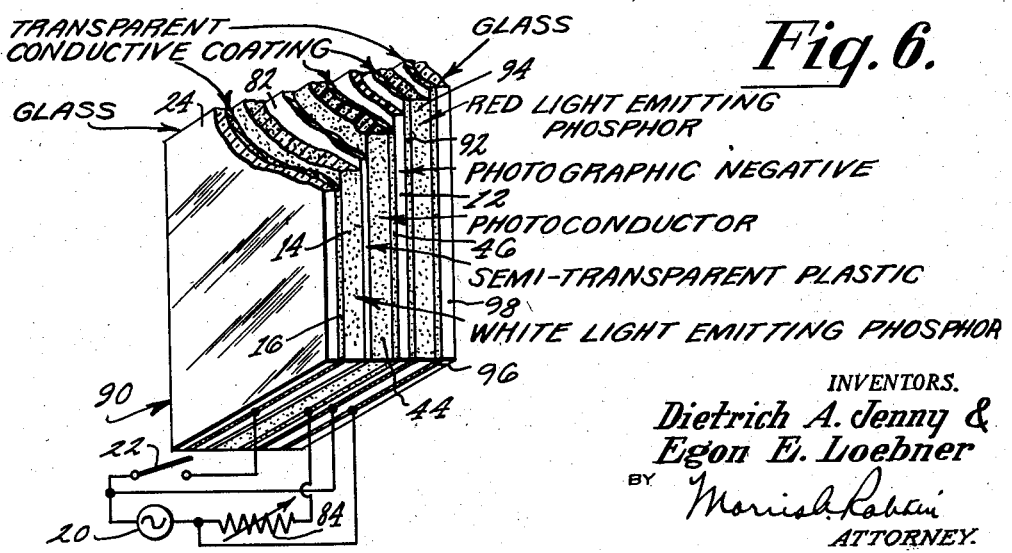
Fig. 6 is a perspective view, with parts broken away, of still a further embodiment of the light inverter of the present invention.

Referring now to Fig. 6, there is shown a light inverter 90 comprising, in the order named, a sandwich-like structure of a glass sheet 24, a transparent conductive coating 16, an electroluminescent layer 14, a semi-transparent plastic sheet 82, a photoconductive layer 44, a transparent conductive coating 46, a transparency 12 whose image is to be light inverted, a transparent photoconductive coating 92, an infrared energy emitting phosphor 94, a transparent conductive coating 96, and the glass sheet 98. The infrared emitting phosphor 94 may be of the zinc selenide type that produces infrared energy when a voltage is impressed across its large surfaces. A source of A.-C. voltage 20 is connected between the conductive coatings 16 and 46 through a serially connected switch 22 and a variable resistor 84. The A.-C. voltage generator 20 is also connected in series with the conductive coatings 92 and 96 for exciting the phosphor 94 so that it will provide infrared energy. The light inverter 90 of Fig. 6 functions similarly to that shown in Fig. 4 with the exception that the light inverter 90 of Fig. 6 provided its infrared energy from the infrared energy emitting phosphor 94.

To provide a light inverted image of the transparency 12, in Fig. 6, the switch 22 is closed and the variable resistor 84 is adjusted. When properly adjusted, a light inverted image of that on the transparency 12 may be viewed through the glass 24 of the light inverter 90.

What is claimed is:

1. Apparatus for producing a light inverted image of a transparency on an electroluminescent layer of the type whose luminescence is quenched by infrared radiation comprising a sandwich-like structure of: a transparent conductive coating, said electroluminescent layer, and a second conductive coating, a source of infrared radiation, means to project an image of said transparency towards said electroluminescent layer with said source of infrared radiation, and means to apply a voltage between the large surfaces of said electroluminescent layer.

2. Apparatus for producing a light inverted image of a transparency on an electroluminescent layer of the type whose luminescence is quenched by luminescent radiation comprising a sandwich-like structure of: a transparent conductive coating, said electroluminescent layer, and a second conductive coating, a source of infrared radiation, means to place a negative between said source of infrared radiation and said electroluminescent layer, and means to apply an electrostatic field between the large surfaces of said electroluminescent layer.

3. The method of producing a light inverted image on an electroluminescent layer of the type whose luminescence is quenched by infrared radiation comprising the steps of placing a transparency of the image to be inverted in front of said electroluminescent layer, directing infrared energy through said transparency and towards said electroluminescent layer, and applying a voltage across said electroluminescent layer.

4. The method of producing a light inverted image on an electroluminescent layer of the type whose luminescence is quenched by infrared radiation comprising the steps of placing a transparency of the image to be inverted in front of said electroluminescent layer, directing infrared energy through said transparency and toward said electroluminescent layer, removing said infrared radiation and said transparency, and applying a voltage between the large surfaces of said electroluminescent layer.

References Cited in the file of this patent

Kazan: "An Electroluminescent Light Amplifying Picture Panel," Proceedings of the Institute of Radio Engineers, December 1955, page 1897.

Destriau and Ivey: Electroluminescence and Related Topics, Proc. of the I.R.E., December 1955, p. 1911.